United States Patent
Coronado

[11] Patent Number: 5,958,363
[45] Date of Patent: Sep. 28, 1999

[54] METHOD FOR MAKING MONOLITHIC METAL OXIDE AEROGELS

[75] Inventor: Paul R. Coronado, Livermore, Calif.

[73] Assignee: The Regents of the University of California, Oakland, Calif.

[21] Appl. No.: 09/182,409

[22] Filed: Oct. 29, 1998

[51] Int. Cl.$^6$ ............... C01B 13/14; C01G 25/02; B01J 13/00; C04B 38/00
[52] U.S. Cl. ............... 423/592; 423/608; 423/630; 252/315.01; 252/315.6; 252/315.7; 501/72; 501/85
[58] Field of Search ................... 423/592, 600, 423/608, 630; 502/300; 501/72, 85; 252/315.01, 315.6, 315.7

[56] References Cited

U.S. PATENT DOCUMENTS

| | | | |
|---|---|---|---|
| 2,249,767 | 7/1941 | Kistler | 252/273 |
| 4,713,233 | 12/1987 | Marsh et al. | 423/608 |
| 4,764,357 | 8/1988 | Sherif et al. | 423/338 |
| 4,957,725 | 9/1990 | Potember et al. | 423/592 |
| 5,112,676 | 5/1992 | Cot et al. | 427/226 |
| 5,304,533 | 4/1994 | Kobayashi et al. | 505/440 |
| 5,391,364 | 2/1995 | Cogliati | 423/335 |
| 5,395,805 | 3/1995 | Droege et al. | 501/72 |
| 5,788,950 | 8/1998 | Imamura et al. | 423/593 |
| 5,851,947 | 12/1998 | Hair et al. | 502/258 |

OTHER PUBLICATIONS

D. M. Smith et al., "Aerogel Synthesis Using Extractive Drying," Mat. Res. Soc. Symp. Proc. vol. 431, 1996 Materials Research Society, pp. 291–296.

Primary Examiner—Gary P. Straub
Assistant Examiner—Cam N. Nguyen
Attorney, Agent, or Firm—Alan H. Thompson

[57] ABSTRACT

Transparent, monolithic metal oxide aerogels of varying densities are produced using a method in which a metal alkoxide solution and a catalyst solution are prepared separately and reacted. The resulting hydrolyzed-condensed colloidal solution is gelled, and the wet gel is contained within a sealed, but gas permeable, containment vessel during supercritical extraction of the solvent. The containment vessel is enclosed within an aqueous atmosphere that is above the supercritical temperature and pressure of the solvent of the metal alkoxide solution.

37 Claims, 3 Drawing Sheets

METHOD FOR MAKING MONOLITHIC METAL OXIDE AEROGELS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the preparation of aerogels, including the extraction of aerogels.

2. Background of the Invention

Aerogels are a special class of open-cell foams derived from the supercritical drying of highly cross-linked inorganic or organic gels. These materials have ultrafine pore sizes of usually less than 1000 Å, continuous porosity, high surface areas of typically 400–1000 $m^2/g$, and a microstructure composed of interconnected colloidal-like particles or polymer chains with characteristic diameters of 100 Å. This microstructure is responsible for the unusual optical, acoustic, thermal, and mechanical properties of aerogels.

Silica aerogels are the most extensively described aerogel materials in the scientific and patent literature. Aerogels of transition metal oxides, in particular, are not as well described, and these aerogels are expected to possess properties that are not possible with silica aerogels due to the presence of the transition metal. The new characteristics of the aerogels will produce interesting new materials for optical, magnetic, and catalytic applications.

The first aerogels were translucent pieces of porous silica glass made by S. S. Kistler (U.S. Pat. No. 2,249,767). Kistler's aerogels are prepared by forming silica hydrogels, which are exchanged with alcohol and dried. The alcohol is supercritically extracted in the drying process, and the resulting aerogel has a density of about 0.05 $g/cm^3$. Kistler's process is time-consuming and laborious, and subsequent advances in the art have reduced the processing time and increased the quality of aerogels.

Other related art discusses the production of metal oxide aerogels other than silica aerogels. Teichner et al., in *Advances in Colloid and Interface Science* 5:245–273 (1976), provides a general discussion of metal oxide aerogels, including oxides of silicon, aluminum, titanium, zirconium, magnesium, nickel, copper, and molybdenum. Lynch (U.S. Pat. No. 3,977,993) discusses a modified Kistler method for making metal oxide aerogels. These aerogels are made by preparing a hydrogel, exchanging the water in the gel with an organic solvent, and then supercritically extracting the organic solvent. The Lynch patent does not discuss the peculiar problems in using different metals, such as tantalum, and the process conditions necessary to ensure that the resulting aerogels form large, transparent, intact solids.

European Patent No. 0382310 by Enichem discusses a process for preparing monoliths of metal oxide aerogels. The process comprises an acidic hydrolysis of a metal alkoxide, the gelation of the resulting colloidal solution, and the supercritical drying of the gel. The patent recognizes the difficulty in obtaining monolithic aerogels with metals other than silicon. The patent addresses the problem by adding a volatile powder of a metal oxide to the colloidal solution at the end of hydrolysis, before gelation.

European Patent No. 0186149 by Stauffer Chemical Co. describes the preparation of non-aged, inorganic oxide-containing aerogels. The method comprises the steps of dissolving the alkoxide in a solvent, optionally adding a catalytic amount of a base or acid, and hydrolyzing the metal compound to produce a gel. At least a stoichiometric amount of water is used in this process for the hydrolysis reaction. The solvent in the gel is exchanged with an extraction fluid, and the fluid in the gel is supercritically extracted to form an aerogel. The patent describes the preparation of amorphous, granular metal oxide aerogels, rather than in monolithic forms, and does not mention transparency.

Although these related patents discuss the formulation of metal oxide aerogels, they do not describe methods to overcome the special problems of producing transparent, monolithic aerogels with variable densities, surface areas, and porosities for materials that are not exclusively silicon oxide. Such materials include, for example, the metal oxide aerogels of tantalum, niobium, tungsten, molybdenum, hafnium, zirconium, titanium, vanadium, chromium, rhenium, the lanthanide metals (Ce—Lu), and may include boron, aluminum, gallium, indium, silicon, germanium, tin, lead, or any mixture of these metals. The present invention recognizes and addresses the need for a relatively inexpensive and environmentally desirable method that produces suitable transparent, monolithic metal oxide aerogels of varying densities.

SUMMARY OF THE INVENTION

The invention is both a process for making transparent, monolithic metal oxide aerogels, and the resulting aerogel products. These aerogels are transparent, monolithic solids having varied but controllable densities, surface areas, and porosities. The aerogels are prepared by forming a solution of a metal alkoxide in a solvent, and by forming a second solution comprising a catalyst, a substoichiometric amount of water, and optionally, more of the solvent used in the first solution. The solutions are mixed, and the alkoxide undergoes hydrolysis and condensation reactions to form a colloidal solution.

In a feature of the invention, the colloidal solution is gelled in a containment vessel of appropriate size, and the vessel with the wet gel is sealed, but is still gas permeable. The containment vessel is placed in an apparatus capable of attaining high pressures and temperatures, where the solvent in the wet gel is supercritically extracted in a surrounding atmosphere of water, or aqueous gaseous mixtures containing additives, to form a dried aerogel. The containment of the wet gel during the gelation and water-assisted extraction step results in a monolithic, transparent aerogel.

DETAILED DESCRIPTION OF THE INVENTION

Figure 1:
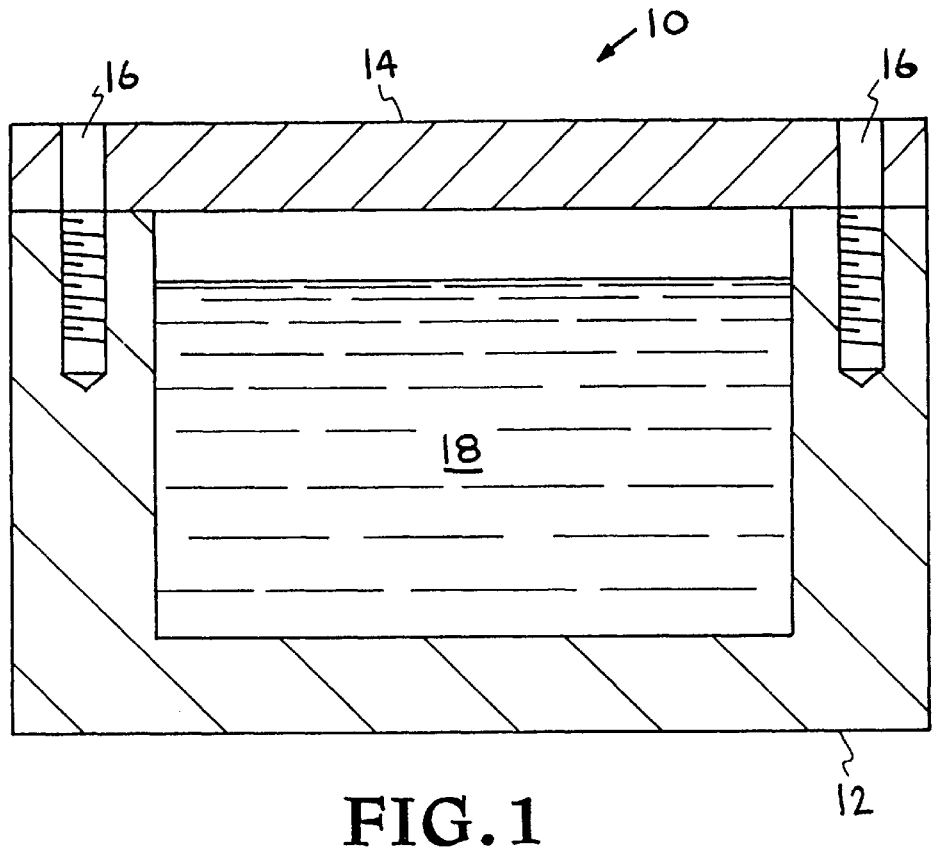
FIG. 1 shows a containment vessel for containing the aerogel solution during processing.

The invention is a method for producing metal oxide aerogels, and the monolithic, transparent aerogels that are formed. The preparation of aerogels involves the controlled hydrolysis of a metal alkoxide dissolved in an organic solvent with water and a catalyst. An alcogel of metal oxide is formed, in which the gel structure comprises a hydrated, alkoxylated metal oxide, and the pores are filled with the organic solvent. In a critical feature of the invention, the alcogel is contained within a containment vessel that is surrounded by a water-containing atmosphere during supercritical extraction of the organic solvent to form the metal oxide aerogel. Before the drying step, the organic solvent in the alcogel may be partially exchanged with another organic solvent, or with an inorganic extraction fluid, such as liquid $CO_2$. The dried aerogels may be heated in an oxygen atmosphere (sintering) to improve transparency and mechanical strength.

The densities of the dried aerogels made using the present method typically range from 70–700 mg/cm$^3$. The method parameters of temperature, pressure, rate of heating, and pressure release are important in preparing the final dried aerogel and in controlling the aerogel's final properties. Control over the formulation and drying steps, as well as post-process treatment, allows for the production of transparent, monolithic metal oxide aerogels having variable densities, surface areas, and porosities.

A. Preparing the Alcogel Solution

The present method employs a hydrolysis-condensation reaction in which a metal alkoxide reacts with water in the presence of an alcohol solvent and a catalyst. The metal alkoxide is first mixed with a compatible alcohol solvent to form an alkoxide solution. The catalyst is mixed with a substoichiometric amount of water, and may be mixed with more of the alcohol solvent, to form a second solution. The catalyst solution is then added to the alkoxide solution to form an alcogel solution. The molar ratio of catalyst to alkoxide is typically 1:500.

This mixing procedure disperses the alkoxide and catalyst in solutions before their reaction. This method prevents the metal from precipitating out or releasing substantial amounts of heat during the exothermic reactions. The amount of solvent added to the alkoxide and the catalyst solutions is controlled, since this amount determines the density of the final aerogel. Typically, about 90% of the solvent is added to the alkoxide solution. The molar ratios of alkoxide, solvent, and water have been chosen to prevent polymerization from proceeding too quickly. The molar ratios are typically in the range of 1 alkoxide:8.5–34 solvent:2.5–3 water. A substoichiometric amount of water is added; controlling the amount of water that is added both as a reactant and as an impurity in the other reagents is extremely important.

Suitable starting materials are alkoxides of metals whose aerogels are especially prone to forming opaque aerogels and to developing physical cracks during formation. Examples of these metals include tantalum, niobium, tungsten, molybdenum, hafnium, zirconium, titanium, vanadium, chromium, rhenium, the lanthanide metals (Ce—Lu), and can include boron, aluminum, gallium, indium, silicon, germanium, tin, lead, or any mixture of these metals. The alkoxides typically are methoxides, ethoxides, propoxides, and butoxides. For example, alkoxides of tantalum include $Ta(OCH_2CH_3)_5$, $Ta(OCH_3)_5$, $Ta(OCH_2CH_2CH_3)_5$, and $Ta(OC(CH_3)_3)_5$.

The alcohol solvent is preferably an alcohol of a common alkyl, such as ethanol, methanol, propanol, butanol, and isomers thereof. The alcohol typically corresponds to the alcohol of the metal alkoxide being dissolved. For example, if the starting material is tantalum ethoxide, then a compatible alcohol is ethanol. In the hydrolysis-condensation reactions, the tantalum ethoxide forms a partially hydrolyzed, partially condensed intermediate, which reacts to form a hydrated, alkoxylated tantalum oxide alcogel having pores filled with ethanol. The reactions for a tantalum ethoxide starting material and an ethanol solvent are straightforward:

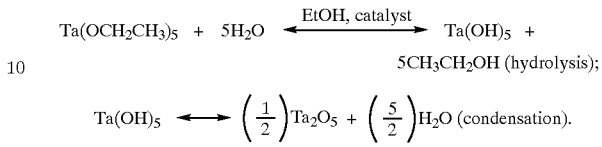

$$Ta(OH)_5 \longleftrightarrow \left(\frac{1}{2}\right)Ta_2O_5 + \left(\frac{5}{2}\right)H_2O \text{ (condensation)}.$$

The catalyst can be an acid or a base, although an acidic medium is preferred. The choice of using an acid or a base is generally dependent on the specific metal oxide being produced. The preferred catalysts in the present invention are nitric acid ($HNO_3$), hydrochloric acid (HCl), fluoroboric acid ($HBF_4$), sulfuric acid ($H_2SO_4$), hydrofluoric acid (HF), acetic acid ($CH_3COOH$), and mixtures of hydrochloric acid and fluoroboric acid. The most preferred catalyst is nitric acid ($HNO_3$), for both chemical and safety reasons. Base catalysts, such as ammonia ($NH_3$), ammonium hydroxide ($NH_4OH$), or diethylamine (($C_2H_5)_2NH$), may not produce aerogels with the desired properties. The use of ammonia or ammonium hydroxide ($NH_3$, $NH_4OH$), for example, tends to produce cloudy or opaque aerogels.

B. Forming the Aerogel

The metal oxide alcogel solution is poured into a containment vessel. FIG. 1 shows an example of a containment vessel 10, which can be of any desired shape or size. The vessel 10 is made of stainless steel or any material that is inert to the metal oxide alcogel solution and will allow easy removal of the aerogel. Typically, the stainless steel surface that is in contact with the gel is highly polished to prevent the gel from sticking. If sticking problems develop after continued use, then the stainless steel can simply be repolished. Lubricants can be used on the container to reduce the sticking, but these may leave an undesirable coating on the final aerogel, and also may burn during the extraction process. Other materials have been used for the containment vessel, such as glass, Teflon®, and other plastics, but they may deform during processing or cause sticking problems. Easy removal of the final aerogel is a serious concern since the aerogels have low densities and can be quite fragile.

The vessel 10 includes a container 12 and a cover 14, which both have holes 16 for fasteners, e.g., screws (not shown), that fasten the cover 14 to the container 12. The design of the vessel 10 is such that a gas-tight seal is not formed. The alcogel solution 18 is allowed to gel at room temperature for about 24 hours. Excess alcohol is poured on top of the gel to keep the gel moist to prevent physical cracking. A minimum of head space is left for expansion of the gel.

The gel may be partially exchanged with an extraction fluid at this point, or the gel may be supercritically extracted directly. Assuming no exchange of solvents, the containment vessel with the gel is sealed, but is still permeable to gas. Spacers, e.g., washers, are not placed between the container and the cover, and the fastened cover thus provides enough space for solvent molecules to pass out of the vessel through the gas permeable pathway. Obviously, gas must be able to escape from the vessel during the drying procedure.

Figure 2:
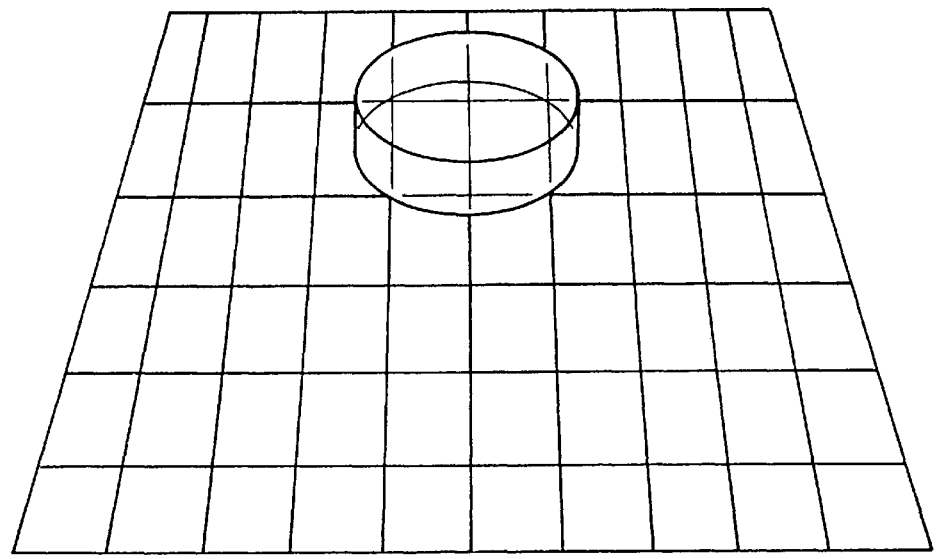
FIGS. 2–4 show monolithic, transparent samples of tantalum oxide aerogel made by the present containment method.
Figure 3:
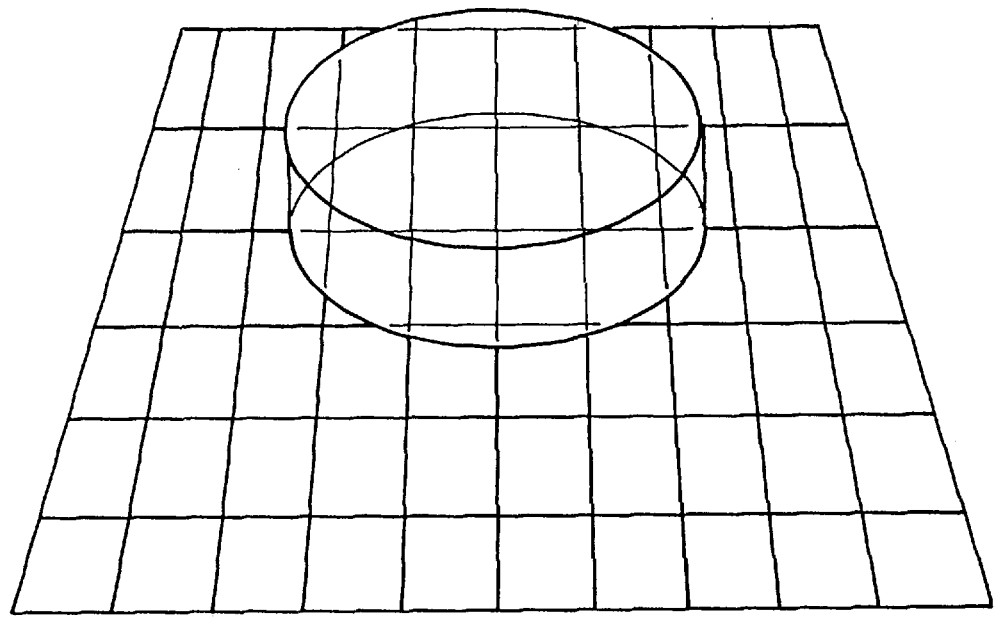
Figure 4:
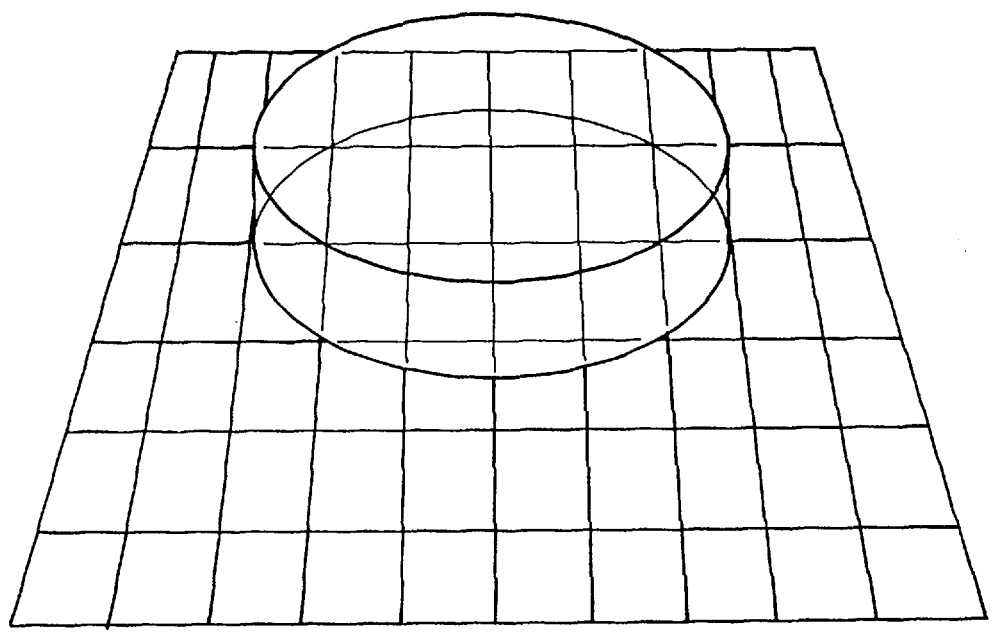
Figure 5:
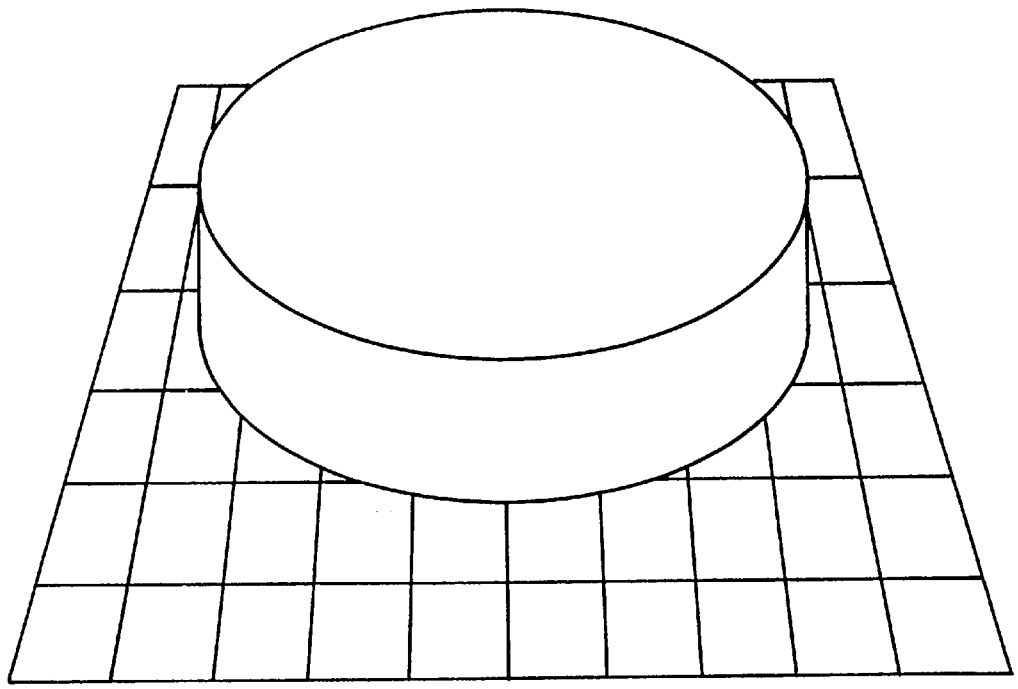
FIG. 5 shows a visibly opaque tantalum oxide aerogel made without containment of the gel during supercritical drying.
Figure 6:
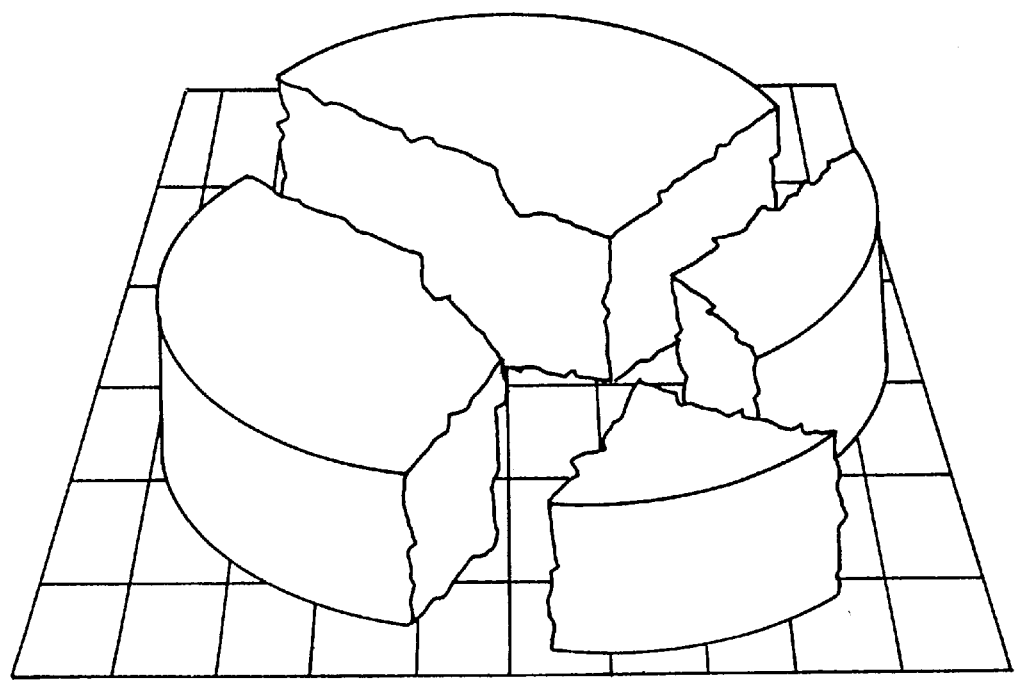
FIG. 6 shows a cracked, broken, and visibly opaque tantalum oxide aerogel sample formed without containment of the gel during the drying step.

The containment of the gel within a containment vessel during the drying process is a critical step in forming monolithic, transparent, metal oxide aerogels. Without this containment, the aerogels form cracks and crumble during drying, and the final materials are opaque and misshapen. FIGS. 2, 3, and 4 show samples of tantalum oxide aerogels that have undergone the containment procedure. The aerogel samples are whole, unbroken, visibly transparent bodies. FIGS. 5 and 6 show tantalum oxide aerogel samples that were produced without containment of the gel during the drying step. FIG. 5 shows a visibly opaque body, and FIG. 6 is an image of a visibly opaque tantalum oxide aerogel that cracked and broke into pieces during processing.

The alcogel solution is typically gelled and dried in the same containment vessel, but the gel may be formed in another container, transferred to the containment vessel, and then supercritically dried in the containment vessel. Performing the gelation and drying steps in the same containment vessel avoids the risk of breaking the gel during transfer.

Before, during or after gelation (preferably after gelation), the sealed containment vessel with the alcogel solution and/or the wet gel can be placed in an autoclave (or similar apparatus) at room temperature (25° C.–30° C.) and water (or aqueous solution) is placed about the containment vessel within the autoclave to provide a sealed water-containing atmosphere surrounding the containment vessel. The autoclave is sealed and pressurized in the presence of the liquid water or aqueous solution to a relatively high pressure (greater than 1200 psi, and preferably above about 2000 psi, and most preferably above 2500 psi), which is above the supercritical pressure of the solvent. The gas permeable pathway out of the containment vessel allows the solvent gas from the alcogel solution or wet gel to escape without water contamination within the containment vessel. Furthermore, the liquid water is preferably removed from the bottom of the autoclave as the gaseous, water-containing overpressure about the containment vessel is increased.

With the presence of the water-containing atmosphere sealed about the containment vessel, the temperature of the wet gel and water-containing atmosphere is raised moderately at a rate in the range from about 0.5–20 degrees C./min., and normally at least about 1° C./min. (>60° C./hr), but preferably at a relatively fast rate of at least about 1.5–15 degrees/min. The use of water allows the temperature to be raised at a relatively faster rate compared to the previous use of organic-based liquids such as liquid alcohols. The final temperature (265° C.–520° C.) exceeds the supercritical temperature of the solvent and may be held for less than 2 hours, but typically from 2–3 hours. It is preferred that the temperature be maintained above about 285° C., and most preferably from about 290° C., to about 335° C. for about 0.75 to about 1.5 hours. By using water or aqueous solution, the dried aerogels are brought down to ambient temperature and atmospheric pressure in greater than about 1.5 to less than 10, and preferably less than 8 hours, which can be faster than during alcohol (or other organic solvent) use.

When aqueous mixtures, e.g., solutions, dispersions or suspensions, are employed, additives can be incorporated into the water in the liquid water-containing atmosphere that is sealed about the containment vessel. Such additives can include acids, bases, salts and organic materials, particularly those associated with the catalysts or alkoxides employed in the preparation of the alcogel. Examples of additives include bases such as NaOH, KOH, $NH_4OH$, acids such as HCl, $HNO_3$, $H_3PO_4$, HF, $CH_3COOH$, $HBF_4$, salts such as alkali metal and/or ammonium carbonates, nitrates, sulfates, phosphates, borates, acetates, fluoroborates, organics such as diethylamine, and gases such as $NH_3$, $CO_2$, organometallics, etc. The additives may be utilized to alter the pH of the water in order to effect the properties of the finished aerogel. The additives, initially in solid, liquid or gas phases, are incorporated into the water by any of the known methods of incorporation such materials, including dissolution, admixing, and the like. Since the water is pressurized to superatmospheric pressure, gases (from the additive(s)) escaping the water can pass through the gas permeable pathway of the containment and interact with the drying or dried aerogel. Any one or more properties of the finished aerogel, such as strength and hydrophobicity can be enhanced by such additive interaction.

When increased hydrophobicity of the aerogel is desired, alkyl groups such as ethyl, propyl, butyl, and preferably methyl, can be incorporated into the dried or dying aerogel through the gas permeable pathway of the containment vessel. Compounds which are sources of the alkyl groups which interact with the surface of the aerogel include trimethylchlorosilane, trimethylbromosilane, dimethylethylchlorosilane, dimethylpropylchlorosilane, dimethyldichlorosilane, trichloromethylsilane, dimethylethylbromosilane, tricholoroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylsilane, dichloropropylsilane, dichlorobutylsilane, dibromomethylsilane, dibromoethylsilane, dibromopropylsilane and dibromobutylsilane.

An alternate method involves the partial replacement of the alcohol solvent with an extraction fluid, which is then supercritically extracted from the wet gel. The extraction fluid may be liquid $CO_2$ or a halogenated hydrocarbon (CFCs or FREONS®), which can be extracted at low temperatures with a Polaron® extractor (or similar device). The extraction fluid may also be an organic solvent that is extracted at a higher temperature, such as methanol, propanol, acetone, or acetylacetone.

C. Post-Process Treatment

To improve transparency and strengthen the aerogel, the aerogel may be sintered by heating to a temperature of 400° C.–500° C. in an oxygen ($O_2$) atmosphere.

The finished aerogel prepared by the method of the invention normally has a surface area of at least about 200 $m^2/g$, and usually in the range from about 250 $m^2/g$ to about 750 $m^2/g$. The final density of the dried aerogel is above 4 $mg/cm^3$, and preferably in the range from about 5–400 $mg/cm^3$. The replacement of liquid alcohol with a water-containing atmosphere about the containment vessel effects a finished aerogel having enhanced physical properties including density and surface area.

WORKING EXAMPLE I

Tantalum and Silicon

A mixed tantalum and silicon alkoxide solution is prepared by combining 1.5 grams of tantalum ethoxide and 14 grams of tetraethoxysilicon (TEOS), and adding 30 milliliters of pure, dry ethanol. A second solution contains 3.5 milliliters of concentrated tetrafluoroboric acid mixed with water to form 5 grams of solution. No alcohol solvent is added to the second solution. After completely mixing the first solution, the second solution (5 grams) is added slowly to the first solution while mixing. The final solution is poured into the containment vessel shown in FIG. 1, and the aerogel is processed as described in Part B. The sealed containment vessel is sealed in an autoclave in the presence of a water atmosphere pressurized to 2000 psi and the temperature is raised at the rate of 6° C./min to 300° C. and held for 1 hour. As the aerogel is dried, ethanol passes out of the gas permeable pathway from the containment vessel and the dried gel is cooled over 2 hours. The final density of the aerogel is about 350 mg/cm$^3$, and the surface area is about 700 m$^2$/g.

The foregoing description of preferred embodiments of the invention is presented for purposes of illustration and description and is not intended to be exhaustive or to limit the invention to the precise form disclosed. Many modifications and variations are possible considering the above teaching. The following claims define the scope of the invention.

The invention claimed is:

1. A method for making monolithic, transparent metal oxide aerogels, said method comprising the steps of:
   (a) hydrolyzing a metal alkoxide in a solution comprising the metal alkoxide, a substoichiometric amount of water, an alcohol solvent, and a catalyst to form a colloidal solution;
   (b) allowing said colloidal solution to gel and form an alcogel;
   (c) containing said alcogel within a containment vessel;
   (d) sealing said containment vessel to produce a sealed containment vessel that is gas permeable;
   (e) supercritically drying the alcogel in said sealed containment vessel by providing a sealed water-containing atmosphere about said sealed containment vessel at above the supercritical temperature and pressure of said alcohol solvent to form a metal oxide aerogel.

2. A method for making metal oxide aerogels as recited in claim 1, wherein the colloidal solution is contained within the containment vessel during gelation.

3. A method for making metal oxide aerogels as recited in claim 1, wherein the metal alkoxide is selected from the group consisting of alkoxides of tantalum, titanium, zirconium, molybdenum, niobium, tungsten, hafnium, vanadium, chromium, rhenium, the lanthanides (Ce—Lu), boron, aluminum, gallium, indium, silicon, germanium, tin, lead, and mixtures thereof.

4. A method for making metal oxide aerogels as recited in claim 1, further comprising the step:
   partially exchanging the alcohol solvent in the alcogel for another extraction fluid before the supercritical drying step.

5. A method for making metal oxide aerogels as recited in claim 4, wherein the extraction fluid is selected from the group consisting of liquid carbon dioxide, acetone, methanol, propanol, halogenated hydrocarbons, and acetylacetone.

6. A method for making metal oxide aerogels as recited in claim 1, wherein the alcohol solvent is selected from the group consisting of methanol, ethanol, propanol, and butanol.

7. A method for making metal oxide aerogels as recited in claim 1, wherein the metal alkoxide is selected from the group consisting of Ta(OCH$_2$CH$_3$)$_5$, Ta(OCH$_3$)$_5$, Ta(OCH$_2$CH$_2$CH$_3$)$_5$, and Ta(OC(CH$_3$)$_3$)$_5$.

8. A method for making metal oxide aerogels as recited in claim 1, wherein the metal alkoxide comprises Ta(OCH$_2$CH$_3$)$_5$, or Zr(OCH$_2$CH$_2$CH$_3$)$_4$, and wherein the alcohol solvent comprises ethanol or propanol.

9. A method for making metal oxide aerogels as recited in claim 1, wherein the alcogel is contained within the containment vessel after gelation.

10. A method for making metal oxide aerogels as recited in claim 1, further comprising a second metal alkoxide in the solution in step (a).

11. A method for making metal oxide aerogels as recited in claim 10, wherein the metal alkoxides comprise Ta(OCH$_2$CH$_3$)$_5$ and Si(OCH$_2$CH$_3$)$_4$, and wherein the alcohol solvent comprises ethanol.

12. A method for making metal oxide aerogels as recited in claim 1, wherein the catalyst is selected from the group consisting of nitric acid (HNO$_3$), hydrochloric acid (HCl), fluoroboric acid (HBF$_4$), ammonium hydroxide (NH$_4$OH), gaseous ammonia (NH$_3$), a mixture of HCl and HBF$_4$, sulfuric acid (H$_2$SO$_4$), hydrofluoric acid (HF), acetic acid (CH$_3$COOH), and diethylamine ((C$_2$H$_5$)$_2$NH).

13. A method for making metal oxide aerogels as recited in claim 1, wherein the catalyst is selected from the group consisting of nitric acid and fluoroboric acid.

14. A method for making metal oxide aerogels as recited in claim 1, wherein the hydrolysis step (a) comprises the steps:
   (1) forming a first solution, comprising the metal alkoxide and the alcohol solvent;
   (2) forming a second solution, comprising the catalyst and the substoichiometric amount of water; and
   (3) reacting the first solution with the second solution to form the colloidal solution.

15. A method for making metal oxide aerogels as recited in claim 14, wherein the second solution in step (2) further comprises an additional amount of alcohol solvent.

16. A method for making metal oxide aerogels as recited in claim 15, wherein at least 90% of the alcohol solvent used in steps (1) and (2) is used in the first solution.

17. A method for making metal oxide aerogels as recited in claim 1, wherein said water-containing atmosphere further comprising an additive.

18. A method for making metal oxide aerogels as recited in claim 17, wherein said additive is selected from the group consisting of acids, bases, salts and organic materials.

19. A method for making metal oxide aerogels as recited in claim 18, wherein said additive selected from the group consisting of nitric acid (HNO$_3$), hydrochloric acid (HCl), fluoroboric acid (HBF$_4$), ammonium hydroxide (NH$_4$OH), gaseous ammonia (NH$_3$), a mixture of HCl and HBF$_4$, sulfuric acid (H$_2$SO$_4$), hydrofluoric acid (HF), acetic acid (CH$_3$COOH), and diethylamine ((C$_2$H$_5$)$_2$NH).

20. A method for making metal oxide aerogels as recited in claim 17, wherein said additive selected from the group consisting of bases including NaOH, KOH and NH$_4$OH, acids including HCl, HNO$_3$, H$_3$PO$_4$, HF, CH$_3$COOH and HBF$_4$, salts including the carbonates, nitrates, sulfates, phosphates, borates, acetates and fluoroborates of alkali metal or ammonium, organics including diethylamine, gases including NH$_3$, CO$_2$, and organometallic materials, including trimethylbromosilane, dimethylethylchlorosilane, triethylchlorosilane, dimethylpropylchlorosilane, dimethyldichlorosilane, trichloromethylsilane, dimethylethylbromosilane, trichloroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylysilane, dichloropropylsilane, dichlorobutylsilane, dibromomethylsilane, dibromoethylsilane, dibromopropylsilane and dibromobutylsilane.

21. A method for making metal oxide aerogels as recited in claim 1, wherein said water-containing atmosphere about said sealed containment vessel is heated to above said supercritical temperature at a rate from about 0.5–20 degrees C./min.

22. A method for making metal oxide aerogels as recited in claim 1, wherein said water-containing atmosphere about said sealed containment vessel is cooled to ambient in about 1.5 to about 8 hours.

23. A method for making metal oxide aerogels as recited in claim 1, wherein said water-containing atmosphere about said sealed containment vessel is heated to a temperature from about 265 degrees C. to about 520 degrees C. to exceed said supercritical temperature of said solvent.

24. A method for making metal oxide aerogels as recited in claim 23, wherein said water-containing atmosphere about said sealed containment vessel is heated to said temperature and held for less than 2 hours.

25. A method for producing a metal oxide aerogel, said method comprising:

extracting an alcohol solvent from an alcogel contained within a sealed containment vessel that is gas permeable, said sealed containment vessel enclosed by water maintained at above the supercritical temperature and pressure of said alcohol solvent, unsealing said sealed containment vessel, and removing a dried metal oxide aerogel from said containment.

26. A method for making metal oxide aerogels as recited in claim 25, wherein said water further comprising an additive.

27. A method for making metal oxide aerogels as recited in claim 26, wherein said additive is selected from the group consisting of acids, bases, salts and organic materials.

28. A method for making metal oxide aerogels as recited in claim 27, wherein said additive selected from the group consisting of nitric acid ($HNO_3$), hydrochloric acid (HCl), fluoroboric add ($HBF_4$), ammonium hydroxide ($NH_4OH$), gaseous ammonia ($NH_3$), a mixture of HCl and $HBF_4$, sulfuric add ($H_2SO_4$), hydrofluoric add (HF), acetic acid ($CH_3COOH$), and diethylamine (($C_2H_5$)$_2NH$).

29. A method for making metal oxide aerogels as recited in claim 27, wherein said additive selected from the group consisting of bases including NaOH, KOH and $NH_4OH$, acids including HCl, $HNO_3$, $H_3PO_4$, HF, $CH_3COOH$ and $HBF_4$, salts including the carbonates, nitrates, sulfates, phosphates, borates, acetates and fluoroborates of alkali metal or ammonium, organics including diethylamine, gases including $NH_3$, $CO_2$, and organometallic materials including trimethylbromosilane, dimethylethylchlorosilane, triethylchlorosilane, dimethylpropylchlorosilane, dimethyldichlorosilane, trichloromethylsilane, dimethylethylbromosilane, trichloroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylysilane, dichloropropylsilane, dichlorobutylsilane, dibromomethylsilane, dibromoethylsilane, dibromopropylsilane and dibromobutylsilane.

30. A method for making metal oxide aerogels as recited in claim 26, wherein said water is enclosed in a water-containing atmosphere about said sealed containment vessel and heated to above said supercritical temperature at a rate from about 0.5–20 degrees C./min.

31. A method for making metal oxide aerogels as recited in claim 30, wherein said water-containing atmosphere about said sealed containment vessel is pressurized to above 1200 psi and cooled to ambient in about 1.5 to about 8 hours.

32. A method for making metal oxide aerogels as recited in claim 30, wherein said water-containing atmosphere about said sealed containment vessel is heated to a temperature from about 285 degrees C. to about 520 degrees C. to exceed said supercritical temperature of said solvent.

33. A method for making metal oxide aerogels as recited in claim 32, wherein said water-containing atmosphere about said sealed containment vessel is heated to said temperature and held for less than 2 hours.

34. A transparent, monolithic metal oxide aerogel having a density in the range of 0.005 g/cm$^3$ to 0.05 g/cm$^3$, comprising a metal selected from the group consisting of tantalum, titanium, zirconium, molybdenum, niobium, tungsten, hafnium, vanadium, chromium, rhenium, the lanthanides (Ce—Lu), boron, aluminum, gallium, indium, germanium, tin, lead, mixtures thereof, and a mixture of at least one metal in the listed group with silicon.

35. A transparent, monolithic metal oxide aerogel as recited in claim 34, wherein the metal is selected from the group consisting of tantalum, molybdenum, niobium, tungsten, hafnium, vanadium, chromium, rhenium, the lanthanides (Ce—Lu), boron, gallium, indium, germanium, tin, lead, mixtures thereof, and a mixture of at least one metal in the listed group with silicon.

36. A transparent, monolithic metal oxide aerogel produced by the method comprising the steps:

(a) hydrolyzing a metal alkoxide in a solution comprising the metal alkoxide, a substoichiometric amount of water, an alcohol solvent, and a catalyst to form a colloidal solution;

(b) allowing the colloidal solution to gel and form an alcogel;

(c) containing the alcogel within a sealed containment vessel that is gas permeable; and (d) supercritically drying the alcogel in the containment vessel to form a metal oxide aerogel.

37. A transparent, monolithic metal oxide aerogel produced by the method as recited in claim 36, wherein the metal alkoxide is selected from the group consisting of alkoxides of tantalum, titanium, zirconium, molybdenum, niobium, tungsten, hafnium, vanadium, chromium, rhenium, the lanthanides (Ce—Lu), boron, aluminum, gallium, indium, silicon, germanium, tin, lead, and mixtures thereof.

* * * * *